Patented Mar. 7, 1939

2,149,351

UNITED STATES PATENT OFFICE 2,149,351

REFINING AND STABILIZATION OF MOTOR FUEL

Edward H. Lang, Chicago, and Rudolph C. Osterstrom, Kenilworth, Ill., assignors, by mesne assignments, to Gasoline Antioxidant Company, Chicago, Ill., a corporation of Delaware No Drawing. Application June 24, 1935,
Serial No. 28,160

14 Claims. (Cl. 196—93)

This invention relates to the process of degumming and stabilizing cracked hydrocarbon motor fuels.

It is well known that cracked gasoline, particularly gasoline produced by the vapor phase cracking of hydrocarbon oils, has a marked tendency to form gum during storage unless properly treated. Various methods have been proposed for refining cracked motor fuels such as treatment with sulfuric acid, fuller's earth, and other polymerizing agents. Such treatment effects the polymerization of the gum-forming constituents to heavy hydrocarbons which can be separated from the gasoline by fractionation. However, the removal of the gum-forming constituents from cracked hydrocarbon motor fuels in accordance with methods taught by the prior art is accompanied by large polymerization losses resulting in materially decreased yields of finished distillate. Not only do known methods of treatment cause excesive loss of desirable motor fuel constituents, but the anti-knock value of the motor fuel may also be materially decreased.

It is also a matter of common knowledge in the petroleum industry that cracked motor fuel can be stabilized against gum and color formation by adding thereto various antioxidants or inhibitors in small quantities. However, the use of antioxidants does not completely avoid the necessity of a preceding chemical or catalytic treatment but is merely an adjunct thereto.

We have discovered that if cracked hydrocarbon motor fuel distillates are subjected to a controlled heat and pressure treatment, followed by fractionation, the gum content thereof can be reduced to an amount which is unobjectionable. If a suitable antioxidant is then added to the gasoline before further oxidation and/or polymerization takes place, the gasoline can be stabilized so that gum will not form to any material extent. The heat and pressure treatment causes relatively small polymerization losses and does not materially decrease the anti-knock rating of the motor fuel. The use of chemicals in the refining of the motor fuel is avoided, thereby decreasing the cost of the finished product and avoiding the difficulty involved in treating and disposing of the refinery wastes.

In addition to being useful in the treatment of raw distillates the process is applicable to the treatment of gasolines which have undergone some amount of aging, i. e., storage in the presence of air and/or light. Aged gasolines which have deteriorated to some extent form peroxides and other compounds which induce gum formation or which are themselves gums or gumformers. By subjecting such gasoline to treatment in acordance with our process, not only may the gasoline be rendered gum-stable but the amount of antioxidant necessary to insure stability may be reduced considerably below the amount necessary when applying the invention to raw distillates.

One of the objects of the invention is to provide a method of treating cracked gasoline and similar motor fuel distillates to remove the gumforming constituents therefrom and to reduce the gum content thereof sufficiently to meet commercial requirements without producing excessive loss of desirable motor fuel constituents.

Another object of the invention is to provide a simple, economical method of reducing and removing gum and gum-forming constituents of cracked motor fuel distillates in a rapid, effective and economical manner.

A further object of the invention is to provide a method of stabilizing cracked motor fuel against gum formation.

A still further object of the invention is to provide a method for refining gasoline under such conditions that its anti-knock value is not diminished and it will remain gum-stable upon addition of suitable gum inhibitors.

Other objects of the invention will be apparent from the following detailed description of the process used in effecting the purposes for which the invention is intended.

Although the invention is applicable to distillates made according to any cracking or polymerizing process, it is particularly useful in connection with the treatment of gasoline prepared by cracking hydrocarbon oil in the vapor phase. In one well known vapor phase process the vapors are cracked at a temperature of from 1000° to 1200° F. and at pressures of from atmospheric to 50 pounds per square inch. Under these conditions, the gasoline formed has a marked tendency to form gum unless properly treated and inhibited.

In carrying out the invention, gasoline distillate or vapors prepared by liquid, liquid-vapor, or vapor phase cracking, or by polymerization or cracking of hydrocarbon gases, are subjected to a heat and pressure treatment wherein the pressure is maintained from 500 to 1500 pounds per square inch, and a temperature in excess of the vaporization temperature of the distillate, but below temperatures at which substantially cracking takes place, is maintained. The heat and pressure treatment may take place either in liquid, vapor, or liquid-vapor phase. The liquid or vapor may be subjected to treatment for a period of time varying between approximately 3 to 10 minutes. During this treatment polymerization of gum-forming and/or color-imparting constituents in the gasoline takes place. The treatment is carried on only long enough so that upon subsequent fractionation the gasoline distillate will be substantially free from gum. When the treatment has been carried sufficiently far the vapors and liquid are fractionated to separate the polymers and heavier ends from the gasoline. The gasoline is then condensed and immediately treated with an inhibitor such as wood tar distillate, tertiary butyl catechol, alpha naphthol, dibenzyl-amino-phenol, pyrogallol, hydroquinone, phenylene diamine, phenyl amino naphthol, phenyl alpha naphthylamine, catechol, benzyl-para-amino-phenol, or mixtures thereof, in sufficient quantity to stabilize the gasoline against further formation of gum. Temperatures ranging from 500° to 700° F. are suitable for use in the treatment but the temperature will vary somewhat depending on the gum-forming proclivity of the material treated and the desirability of treating in the liquid or vapor state. When treating in liquid phase the temperature should not exceed substantially 600° F. For vapor phase treatment, temperatures between 600° to 700° F. are suitable. The more elevated pressures produce more rapid polymerization of the gum content and it has been found that pressures of approximately 600 to 1000 pounds per square inch are satisfactory although at the higher temperatures, pressures as low as 500 pounds per square inch give good results.

If it is desired to treat in the vapor phase, the vapors coming from the fractionating tower of a cracking still may, without prior condensation, be passed into an enlarged treating chamber or through an elongated reaction coil maintained at the desired temperature. If the cracking treatment has been carried out under low pressure, as for example, in vapor phase cracking, the vapors may be compressed prior to entrance into the reaction coil or chamber. The chamber or coil should be of sufficient size or length to permit the vapors to be retained therein for a sufficient length of time, preferably about 5 to 7 minutes, to effect the desired degumming. The duration of treatment will vary with the particular type of vapors being treated—vapor phase cracked vapors generally requiring a longer period of treatment than liquid phase cracked vapors. After the vapors have been sufficiently treated, the pressure thereon is reduced and the resulting products may be passed into a fractionating tower where the gasoline vapors are separated as an overhead product and condensed. The resulting condensate is immediately treated with a gum inhibitor. The color of the resulting product may not be water white. However, the gasoline will be gum- and color-stable after addition of the inhibitor and the color of the gasoline is of little moment since it does not affect the gasoline deleteriously and the gasoline is usually dyed before it is placed on the market.

If it is desired to prepare a water white gasoline, the heavier fraction or fractions may be subjected to suitable decolorizing treatment, as for example, light sulfuric acid treatment or treatment with fuller's earth or other adsorptive catalyst in liquid or vapor state at elevated temperatures. Since the heavier fractions contain substantially all the color producing bodies and only a small proportion of the anti-knock constituents, the color of the finally blended fractions can be substantially improved without materially affecting the anti-knock value of the finished product.

If it is desired to treat in the liquid phase, the gasoline distillate resulting from the cracking process or from the conversion of hydrocarbon gas is pumped through a heating and reaction zone under pressure sufficient to maintain the gasoline in the liquid phase and the gasoline heated to a temperature of approximately 600° F. The pressure may be approximately 1000 pounds per square inch and the gasoline subjected to the heat treatment for a period of approximately 6 minutes. In treating in the liquid phase it is preferable to use an elongated coil as the reaction chamber. The products are then treated in the same manner as described in connection with vapor phase.

It has been found that intermediate fraction of the gasoline is the most active gum-former, while the heavy end is the least active. It may therefore be desirable to separate the gasoline into two or more fractions prior to refining. For example, the gasoline may be sepaarted by careful fractional distillation into a light end boiling up to approximately 200° F. end point, an intermediate fraction boiling from approximately 200° F. initial up to 330° F. end point, and a heavy fraction having an initial boiling point of approximately 330° F. and an end point of 450° to 465° F., Engler distillation method. The intermediate fraction may be subjected either in the liquid or vapor phase to the most stringent conditions of temperature and pressure, the light fraction to less stringent conditions, and the heavy end to only a very light treatment or possibly the heavy end may not require any treatment whatever except the addition of inhibitor; or the three fractions may be subjected to the same conditions of temperature and pressure, but the intermediate subjected to a longer period of treatment than the light fraction, and likewise the light fraction subjected to a longer period of treatment than the heavy end, or the intermediate fraction may be subjected to both more stringent conditions of temperature and pressure and longer time. It may be expedient to unite the light and heavy fractions and treat them together; or it may not be necessary to subject the light and heavy fractions to any heat and pressure treatment. In any case the temperature, pressure, and time will be within the limits previously mentioned.

In practice the gasoline fraction may be subjected to flash distillation and separated into two fractions, the lighter of which may be taken off at a temperature of approximately 250° F. The major portion of the gum-forming constituents will be carried over in the lighter fraction and this fraction may be subjected to more stringent heat and pressure treatment, within the limits above described, than that to which the heavier fraction is subjected. The heavy fraction may or may not be subjected to heat and pressure treatment, and/or decolorizing treatment, depending on the necessity therefor.

After treatment the fractions are reblended and redistilled and fractionated together to form the finished distillate to which the inhibitor is added. In this manner a considerable saving is effected in the amount of treatment necessary and the losses are considerably reduced by virtue of the fact that the fractions which require little or no treatment are not subjected to the stringent conditions which would cause polymerization of desirable fractions thereof. Instead of separating the distillate into three fractions, it may be separated into only two fractions or, if desired, more than three fractions can be separated and subjected to independent treatment.

The amount of inhibitor to be added to the treated distillate may vary from 0.0001% to 0.1%, preferably between .0005 and .01%, depending upon the efficacy of the inhibitor. Any well known inhibitor now in use for inhibiting color and gum formation to gasoline may be used.

In treating gasoline or other motor fuel distillates in accordance with our process, it is possible to degum such distillates in a very short time with comparatively small loss from polymerization. The heat and pressure treatment above described in conjunction with the addition of the inhibitor forms an eminently suitable process for treating cracked distillates having a large content of polymerizable constituents which are valuable motor fuel constituents. In accordance with this process the gasoline is not subjected to the drastic treatment heretofore considered necessary to prepare stable motor fuel but is subjected only to that degree of treatment which is necessary to remove the gum content and the more readily polymerizable constituents, and enable the subsequently added inhibitor to maintain the gasoline in a gum stable condition. As a result the anti-knock value of the gasoline remains unimpaired whereas in accordance with prior methods of treatment the reduction in anti-knock value has been considerable, amounting to several points on the octane scale even with the best available methods.

What is claimed is:

1. A method of treating hydrocarbon motor fuel containing gum-forming constituents unstable in the presence of gum inhibitors which consists in subjecting said motor fuel to temperatures in excess of its vaporizing temperature but below temperatures at which substantial cracking takes place, for a period of time sufficient to render the motor fuel gum free upon subsequent fractionation but insufficient to render said motor fuel gum stable, and immediately thereafter adding thereto a gum inhibitor.

2. A method of treating hydrocarbon motor fuel containing gum-forming constituents unstable in the presence of gum inhibitors which consists in subjecting said motor fuel to a temperature between 500° to 700° F. under pressures of from 500 to 1500 pounds per square inch for a period of time from 3 to 10 minutes in order to render the motor fuel susceptible to gum inhibitors but not to render the motor fuel gum stable, fractionating the resulting products to separate the motor fuel distillate, and immediately thereafter adding thereto a gum inhibitor.

3. A method of treating hydrocarbon distillates containing gum-forming constituents unstable in the presence of gum inhibitors, for the purpose of stabilizing the same which consists in separating said distillates into a plurality of fractions, one of which contains the major portion of the gum-forming constituents, subjecting the latter fraction to such heat and pressure treatment that upon subsequent separation of polymers formed during the treatment the fraction is substantially gum free but not gum stable, reblending the separated fractions and immediately adding thereto a gum inhibitor.

4. Method in accodrance with claim 3 in which the fractions containing the minor portion of the gum-forming constituents is subjected to less stringent treatment than the fraction containing the major portion of the gum-forming constituents.

5. A method of treating gasoline distillate containing gum-forming constituents unstable in the presence of gum inhibitors, for the purpose of stabilizing the same which comprises separating from said distillate a fraction having an initial boiling point of approximately 200° F. and an end point of approximately 330° F., subjecting said fraction to non-cracking heat and pressure treatment sufficient to render it substantially gum free after subsequent distillation but not gum stable, reblending said fraction with the remaining distillate and immediately adding a gum inhibitor thereto.

6. Method in accordance with claim 12 in which the distillate remaining after separation of the fraction is subjected to less stringent treatment than the separated fraction.

7. The method of stabilizing cracked distillate which is not susceptible to stabilization by addition of gum inhibitors which consists in subjecting said distillate to heat and pressure treatment sufficient to polymerize those gum-forming constituents which are non-susceptible, but insufficient to render the distillate gum stable, fractionating said distillate to end point motor fuel, and immediately thereafter adding a gum inhibitor thereto.

8. Method in according with claim 7 in which the distillate is refined by subjecting it to pressures of from 500–1500 pounds per square inch and temperatures of 500°–700° F. for a period of time of 3 to 10 minutes.

9. In a method of treating motor fuel distillate containing gum and gum-forming constituents unstable in the presence of gum inhibitor the steps which consist in separating from said distillate an intermediate fraction containing the major portion of the gum-forming constituents, subjecting said fraction to a temperature above vaporizing temperature but below that at which cracking occurs and to high pressure in order to polymerize a substantial portion of the gum-forming constituents therein without rendering said fraction gum-stable, reblending the treated fraction with the heavier and lighter fractions, and immediately adding a gum inhibitor thereto.

10. Method in accordance with claim 9 in which the intermediate fraction is treated by subjecting it to temperatures of 500°–700° F. under pressures of 500–1500 pounds per square inch for a period of time of 3 to 10 minutes.

11. In a method of treating motor fuel distillate containing gum and gum-forming constituents unstable in the presence of gum inhibitor the steps which comprise separating from said distillate a fraction having an initial boiling point of approximately 200° F. and an end point of approximately 330° F., subjecting said fraction to treatment at a temperature of from 500 to 700° F. under pressures of from 500 to 1500 pounds per square inch for a period of time ranging from 3 to 10 minutes in order to render said fraction susceptible to gum inhibitors but not to render said fraction gum stable, reblending the treated fraction with the remaining distillate, fractionating the distillate to end-point gasoline and immediately adding a small amount of a gum inhibitor thereto.

12. A method of treating a gasoline distillate containing gum-forming constituents for the purpose of stabilizing the same, the steps comprising separating from said distillate a fraction having an initial boiling point of approximately 200° F. and an end boiling point of approximately 330° F., subjecting said fraction to a temperature of from 500 to 700° F. under pressure of from 500 to 1500 lbs. per square inch for a period of time varying from 3 to 10 minutes to render said fraction substantially gum free after subsequent distillation but not gum stable, blending said fraction with the remaining distillate and immediately adding a small amount of a gum inhibitor thereto.

13. The method of stabilizing a cracked hydrocarbon distillate containing gum and gum-forming constituents, which comprises subjecting said distillate to a temperature of from 500 to 700° F. under a pressure of from 500 to 1500 pounds per square inch for a short period of time in order to render said distillate susceptible to gum inhibitors but not to render said distillate gum stable, fractionating the treated distillate to remove constituents heavier than those desirable in gasoline and immediately adding a small amount of a gum inhibitor thereto to retard gum formation.

14. In the method of treating motor fuel distillate containing gum-forming and color-imparting bodies, the steps which comprise fractionating said distillate into a light fraction containing the major portion of the gum-forming constituents and a heavy fraction containing the major portion of the color-imparting bodies, subjecting the light fraction to temperatures between 500 and 700° F. under pressures between 500 and 1500 pounds per square inch for a period of time ranging from 3 to 10 minutes in order to render said light fraction susceptible to gum inhibitors but not to render said light fraction gum stable, subjecting the heavier fraction to a less stringent temperature treatment to decolorize the same, blending the two fractions, fractionating the blend to give a gasoline of the desired end point and immediately adding thereto a small amount of gum inhibitor.

EDWARD H. LANG.
RUDOLPH C. OSTERSTROM.